United States Patent [19]
Anderton et al.

[11] Patent Number: 5,243,438
[45] Date of Patent: Sep. 7, 1993

[54] FACSIMILE COMPRESSION FOR TRANSMISSION

[75] Inventors: David O. Anderton, Westminster, Colo.; Ronald L. Daggett, Red Bank, N.J.

[73] Assignee: AT&T Bell Laboratories, Murray Hill, N.J.

[21] Appl. No.: 864,188

[22] Filed: Apr. 3, 1992

Related U.S. Application Data

[63] Continuation of Ser. No. 428,560, Oct. 30, 1989, abandoned.

[51] Int. Cl.$^5$ ............................ H04N 1/41; H04N 1/32
[52] U.S. Cl. ...................................... 358/426; 358/468; 370/94.1
[58] Field of Search ............... 358/426, 434, 435, 436, 358/438, 439, 468; 370/110.1, 94.1, 94.2, 60.1, 60, 76; 379/93, 100

[56] References Cited

U.S. PATENT DOCUMENTS

| | | | |
|---|---|---|---|
| 3,939,307 | 2/1976 | Bishop | 370/110.1 |
| 4,873,715 | 10/1989 | Shibata | 370/110.1 |
| 4,914,650 | 4/1990 | Sriram | 370/94.1 |
| 4,974,099 | 11/1990 | Lin et al. | 358/426 |

OTHER PUBLICATIONS

CCITT Recommendation T.30, Revised, "Procedures For Document Facsimile Transmission In The General Switched Telephone Network", CCITT document AP IX-24-E, date Mar. 1988, pp. 33-128.

Primary Examiner—Edward L. Coles, Jr.
Assistant Examiner—Thomas D. Lee
Attorney, Agent, or Firm—Thomas Stafford

[57] ABSTRACT

A transmission arrangement is disclosed which facilitates compression of modem modulated facsimile signals for transmission on digital facilities. The presence of a facsimile call is detected and facsimile control messages are obtained by demodulating and interpreting the facsimile call control protocol. A controller is responsive to the obtained control messages for controlling a voiceband encoder to encode the control portion of the facsimile call and for controlling a so-called facsimile page demodulator to demodulate any facsimile page portions of the facsimile call to obtain a baseband digital bit stream. The encoded control portion of the facsimile call and the baseband digital bit stream representative of the demodulated, i.e., compressed, facsimile page portion of the facsimile call are transmitted along with control information (as side information) to a receiver. At the receiver, a replica of the original modem modulated facsimile signal is reconstructed in response to the control information and by decoding the control portion of the facsimile call and by remodulating the digital bit stream representative of the facsimile page portion of the facsimile call.

33 Claims, 7 Drawing Sheets

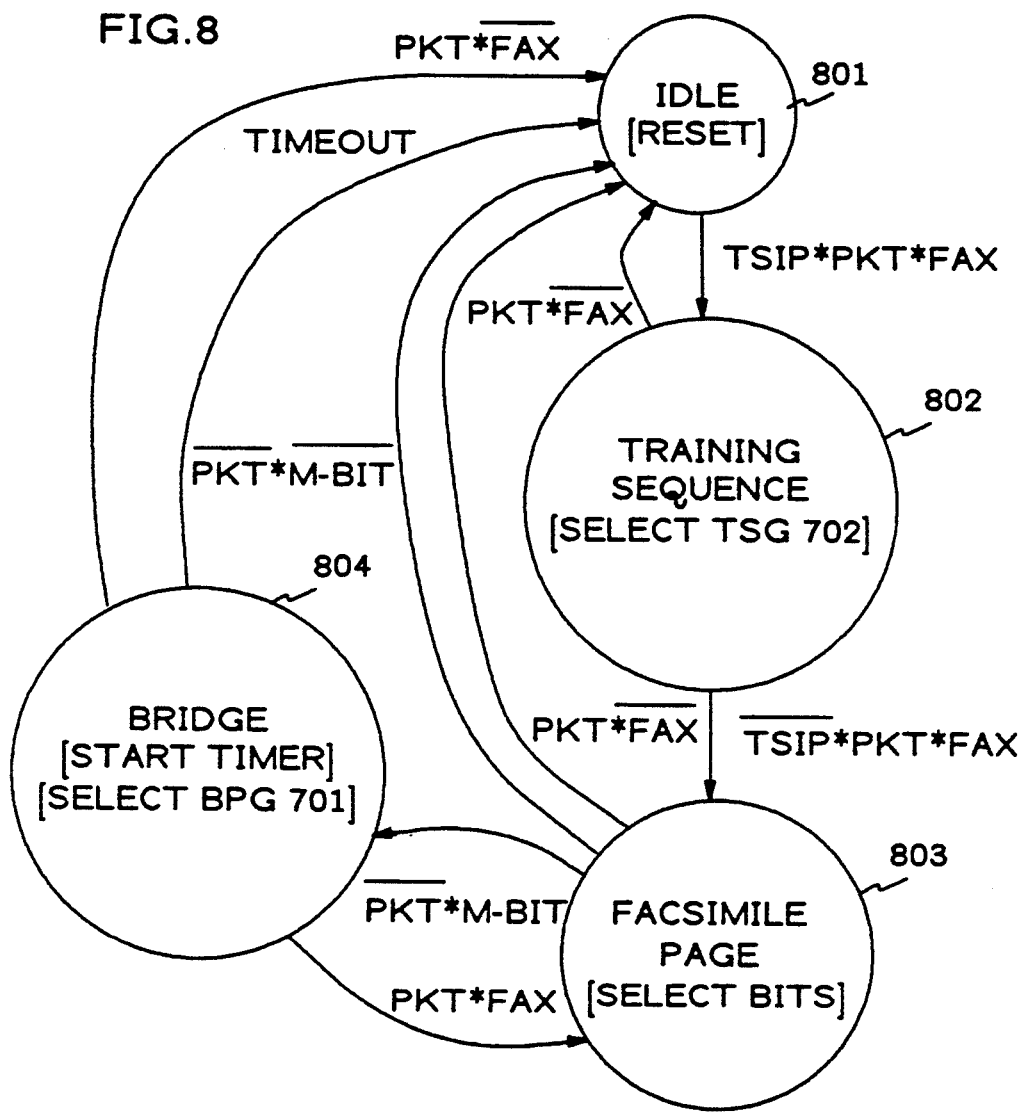

FACSIMILE COMPRESSION FOR TRANSMISSION

This application is a continuation of application Ser. No. 07/428,560, filed on Oct. 30, 1989.

TECHNICAL FIELD

This invention relates to digital transmission of voiceband signals and, more particularly, to transmission of voiceband facsimile signals.

BACKGROUND OF THE INVENTION

In modern digital transmission systems facsimile calls are transmitted in the same channel as voice and voiceband data calls. Recently, facsimile, voice and voiceband data calls have been transmitted in the same channel by employing voiceband signal compression techniques such as Adaptive Differential PCM (ADPCM) and digital speech interpolation. Additionally, it is noted that no indication is provided, by associated switching or other equipment, to the transmission network as to the nature of the current call, i.e., facsimile, voice or voiceband data.

The increase in use of facsimile has led to the inefficient utilization of prior transmission resources. This inefficiency results because traditional analog or modem based facsimile transmission is time and bandwidth intensive. This reduces the effectiveness of prior signal compression techniques and, consequently, the other signals, e.g., voice and voiceband data, cannot share the channel bandwidth resources.

SUMMARY OF THE INVENTION

The inefficiencies of prior facsimile transmission arrangements are overcome, in accordance with an aspect of the invention, by detecting the presence of a facsimile call and demodulating the page portion of the facsimile signal to obtain a baseband digital bit stream which is transported along with control information to a receiver. At the receiver the received baseband digital bit stream is remodulated in response to the control information to reconstruct a replica of the original modem modulated facsimile signal. This replica facsimile signal is then transported in a conventional manner to a receiving facsimile apparatus.

More specifically, during a facsimile call, facsimile control messages are obtained by demodulating and interpreting the facsimile control protocol. A controller in response to the obtained control messages, obtains the facsimile modem parameters, e.g. modem type and modem speed, and supplies them to a so-called facsimile page demodulator. The controller in response to the obtained control messages and other signals, also generates control signals for appropriately enabling and disabling the facsimile page demodulator and a voiceband encoder, and for selecting an output from either the facsimile page demodulator or voiceband encoder for transmission. Control information is also supplied for transmission in order to properly reconstruct the facsimile signal at a receiver.

In an exemplary embodiment, information being transmitted is formatted into packets and, further, efficiencies are realized by detecting the type of training sequence used for the facsimile page portion of the call and communicating the training sequence type in compressed form to a remote receiver. In turn, the receiver is responsive to the supplied training sequence type to regenerate the proper training sequence.

BRIEF DESCRIPTION OF THE DRAWING

In the Drawing:

FIG. 8 is a state diagram illustrating operation of selector controller unit 703 employed in facsimile page remodulator 117 of FIG. 7.

DETAILED DESCRIPTION

Figure 1:
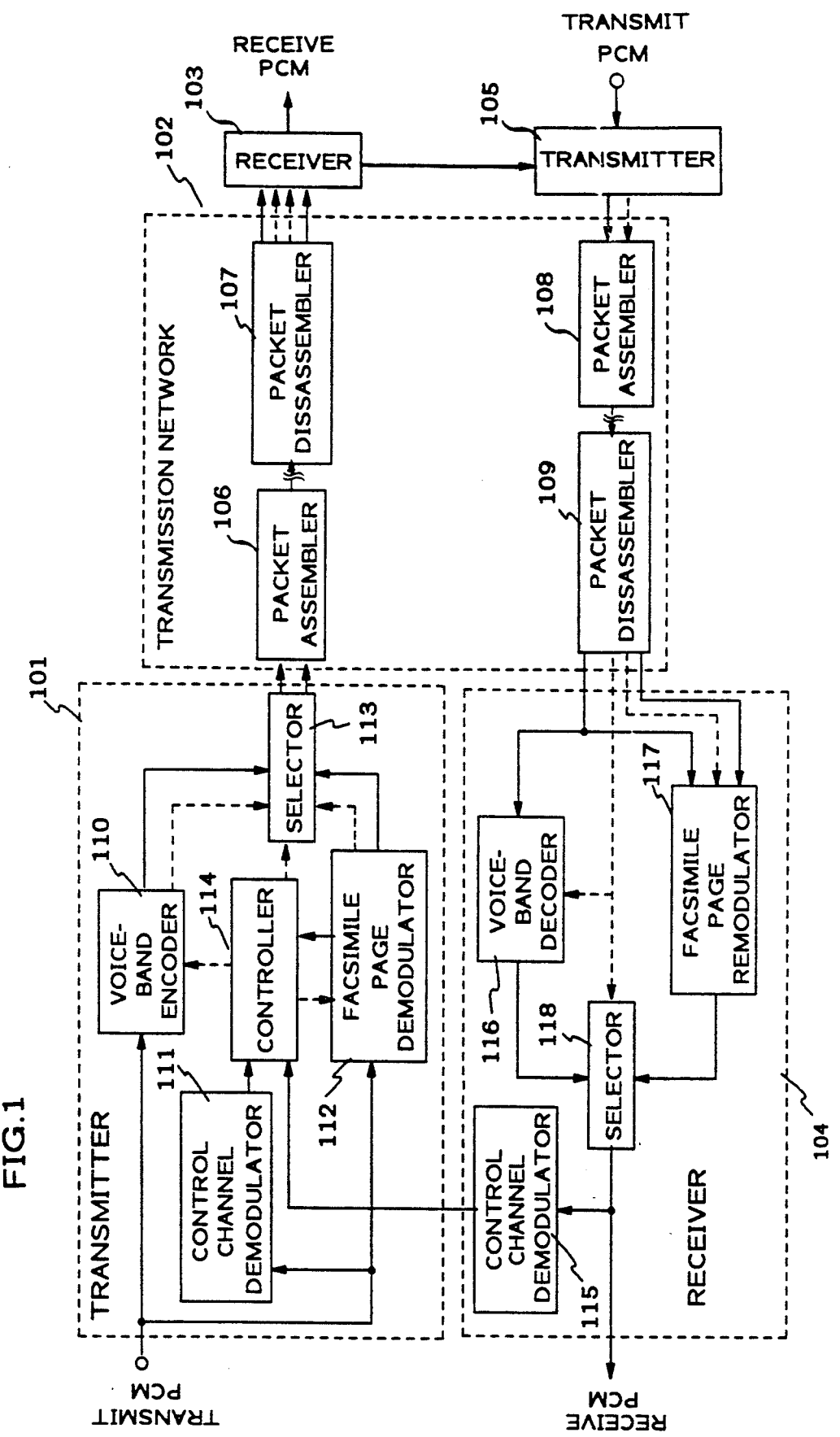
FIG. 1 shows, in simplified block diagram form, details of a transmission system including an embodiment of the invention.

FIG. 1 shows, in simplified block diagram form, a transmission system employing an embodiment of the invention for compressing facsimile signals. Accordingly, shown are near-end transmitter 101 and far-end receiver 103 which are employed in conjunction with transmission network 102 for a first direction of transmission. Also shown are near-end receiver 104 and far-end transmitter 105 which are employed in conjunction with transmission network 102 for a second direction of transmission. In this example, not to be construed as limiting the scope of the invention, transmission network 102 is shown as including packet assembler 106 and packet disassembler 107 for transmission in the first direction, and packet assembler 108 and packet disassembler 109 for transmission in the second direction. The transmissions between the near-end and far-end may be over any desired transmission medium. To this end, packet assemblers 106 and 108 include apparatus for supplying the assembled packets to the transmission medium and packet disassemblers 107 and 109 include apparatus for obtaining packets to be disassembled from the transmission medium. It is noted that transmitter 101, packet assembler 106, packet disassembler 107 and receiver 103 used in the first direction of transmission are, in this example, identical in structure and operation to their counterparts used in the second direction of transmission, namely, transmitter 105, packet assembler 108, packet disassembler 109 and receiver 104. Such packet assemblers and disassemblers are known in the art (see for example, U.S. Pat. No. 4,703,477, issued Oct. 27, 1987). Consequently, only transmitter 101 and receiver 104 will be described in detail.

Figure 5:
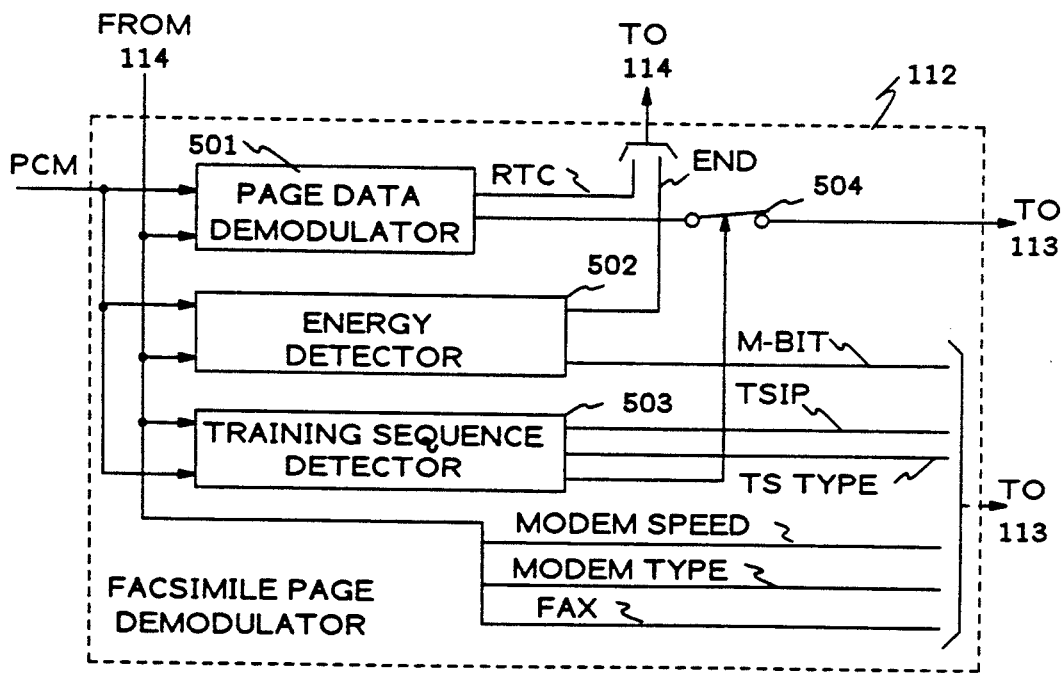
FIG. 5 shows, in simplified block diagram form, details of facsimile page demodulator 112 of FIG. 1.

Transmit pulse code modulation (PCM) signals are supplied to transmitter 101 to be compressed for transmission via transmission network 102 to remote receiver 103, where they are reconstituted as received versions of the original PCM signals. The PCM signals are, in this example, well known DS0 channels from the DS1 format or channels from the CEPT1 Primary Digital Signal. It will be apparent to those skilled in the art that other signal formats, digital or otherwise, may be equally employed in practicing the invention. The transmit PCM signals are supplied in transmitter 101 to voiceband encoder 110, control channel demodulator 111 and facsimile page demodulator 112. Voiceband encoder 110 may be any of known encoders employed in compressing voiceband PCM signals. In this example, an Adaptive Differential PCM (ADPCM) encoder is employed. Such ADPCM encoders are now well known in the art (see, for example CCITT Standard G. 721). The compressed PCM signals from voiceband encoder 110 are supplied to one input of selector 113. Additionally, when voiceband encoder 110 is enabled, it also supplies a control signal for transmission to selector 113 indicating the enabled condition. This control signal is a facsimile call indication (FAX) signal and is an indication that voiceband signals are being transmitted and facsimile page demodulator 112 is disabled, i.e., FAX=0. During a facsimile call voiceband encoder 110 is enabled in response to the FAX control signal from controller 114 to compress the control portion of the facsimile call, i.e., the facsimile call control messages. When facsimile page demodulator 112 is enabled, i.e., FAX=1, encoder 110 is disabled. Since an ADPCM encoder is employed in this example, it is reset to known initial state conditions in response to the FAX=1 control signal. It is noted that the control portion of the facsimile call is communicated with so-called low speed voiceband data and, therefore, is compressible using ADPCM. Although an ADPCM encoder is employed in this example, it will be apparent to those skilled in the art that some other type encoder may equally be employed that may require some other form of control or no control, e.g., a PCM encoder. Facsimile page demodulator 112 is a so-called modem demodulator which is enabled and disabled in response to the FAX control signal from controller 114. Facsimile page demodulator 112 is enabled when FAX=1. Additionally, facsimile page demodulator 112 is responsive to other control signals, i.e., facsimile call page data demodulation control signals, from controller 114 to demodulate the modem modulated page portion of the facsimile call. It is noted that the modem modulated signals representative of the information on a document page are demodulated to obtain a so-called baseband digital bit stream. In this manner, the bandwidth required to transmit the page portion of the facsimile call is significantly reduced. Facsimile page demodulator 112 is responsive to control signals from controller 114 to select the modem type and modem speed, i.e., the transmission rate, corresponding to the supplied facsimile signal to be demodulated. Additionally, facsimile page demodulator 112 is responsive to the supplied PCM signals to determine the presence of a facsimile signal, the end of the facsimile signal and the end of the page portion of the facsimile call, and supplies a so-called end of energy (END) signal and a return to control (RTC) signal indicating the same to controller 114. An output from facsimile page demodulator 112 is supplied to a second input of selector 113. Facsimile page demodulator 112 also supplies a plurality of so-called control facsimile call remodulation signals for transmission to selector 113 which are described below. In one example, the facsimile page information is transmitted in the CCITT Recommendation V.29 format. It will be apparent that facsimile page demodulator 112 also operates to demodulate partial page facsimile transmissions in a facsimile call (see for example CCITT Recommendation T.30, Revised, entitled "Procedures For Document Facsimile Transmission In The General Switched Telephone Network", which is included in CCITT document AP 1X-24 E, dated March 1988, pages 33-128). Details of facsimile page demodulator 112 are shown in FIG. 5 and described below.

For clarity of description, the voiceband and control outputs from voiceband encoder 110 and facsimile page demodulator 112 are shown as being supplied to a separate selected 113. However, it will be apparent that the selection function is readily realized by simply switching outputs of voiceband encoder 110 and facsimile page demodulator 112. It is noted that the facsimile call remodulation control signals, in this example, accompany the demodulated baseband digital bit stream as so-called side information by being placed in appropriate fields of a packet header in packet assembler 106 in a manner that will be apparent to those skilled in the art.

Control channel demodulator 111 demodulates the control component of any facsimile signals supplied in a PCM channel time slot to obtain the control messages therefrom. In this manner, the presence of a facsimile call is detected, in accordance with an aspect of the invention, without prior knowledge of its existence. These control messages are supplied to controller 114. In one example, the facsimile control messages are transmitted in the CCITT Recommendation V.21 format. Control messages are obtained from a received channel via control channel demodulator 115 in a similar manner and supplied to controller 114. Control channel demodulators 111 and 115 are identical in structure and operation and are described below in conjunction with FIG. 4. It is to be noted that although both control channel demodulators 111 and 115 are being shown for clarity of description, a single such control channel demodulator is typically used in practice to demodulate both the transmit and receive control channels since they are half duplex. Thus, in practice only control channel demodulator 111 would be employed to demodulate the control portion of the facsimile call in both directions of transmission.

Controller 114 in response to the control messages from control channel demodulators 111 and 115, and the end of energy signal from facsimile page demodulator 112, in accordance with an aspect of the invention, generates control signals for enabling and disabling voiceband encoder 110, for enabling and disabling facsimile page demodulator 112, and for providing modem type and speed thereto, and for controlling the output selection via selector 113. Control information accompanies the selected output from selector 113 which is supplied to transmission network 102 and, therein, to packet assembler 106. In this example, as indicated above, the selected facsimile and control signals are supplied to packet assembler 106 to be formed into packets and transmitted via a transmission medium to a remote packet disassembler 107 and, in turn, to receiver 103. Control information accompanying the channel is inserted into predetermined fields in the header of the packets, in well known fashion and is described below in conjunction with FIG. 6 for a facsimile packet. Selector 113 is responsive to control signals from controller 114 to select an output from either voiceband encoder 110 or facsimile page demodulator 112 and supply the selected output to packet assembler 106. As indicated above, this output selection function is readily realized in voiceband encoder 110 and facsimile page demodulator 112. From a received channel, packet disassembler 109 obtains a plurality of control signals, namely, FAX, modem type, modem speed, TS TYPE, TSIP and the M-bit signal from the received packet header and supplies them appropriately to voiceband decoder 116, facsimile page remodulator 117 and selector 118. Also supplied to facsimile page remodulator 117 from packet disassembler 109 is a signal indicating whether a packet is present, namely, PKT. Packet disassembler 109 also supplies the channel baseband digital bit stream (BITS) from the packet information field to voiceband decoder 116 and facsimile page remodulator 117. If the received channel contains other than facsimile page information, i.e., voiceband signals as determined by FAX=0, voiceband decoder 116 is enabled and selector 118 is controlled to select the output from voiceband decoder 116 as the received PCM signal. Voiceband decoder 116, in this example, is an ADPCM decoder which is compatible with voiceband encoder 110 (see CCITT Recommendation G.721). Again, during a facsimile call the control portion of the facsimile signal i.e., the facsimile call control messages is transmitted as a voiceband signal. Although an ADPCM decoder is employed in this example, it will be apparent to those skilled in the art that some other type decoder may equally be employed that may require some other form of control or no control, e.g., a PCM decoder. Upon termination of a signal to be decoded, voiceband decoder 116 resets to prescribed initial state conditions. If the channel contains demodulated facsimile page information, a control signal, in this example, FAX=1, enables facsimile page remodulator 117. Then, in response to other of the facsimile call remodulation control signals, facsimile page remodulator 117 remodulates the facsimile page data, i.e., the baseband digital bit stream, to obtain a replica of the original facsimile signal and selector 118 is controlled to select the output from facsimile page remodulator 117 as the received PCM signal. It will be apparent that facsimile page remodulator 117 also operates to remodulates partial page facsimile transmissions in a facsimile call (again, see the CCITT recommendation T.30, Revised, cited above). Details of facsimile page remodulator 117 are shown in FIG. 7 and described below. As in transmitter 101, the output selection is readily realized by switching outputs of voiceband decoder 116 and facsimile page remodulator 117. Selector 118 is being separately shown only for clarity of description.

Controller

Figure 2:
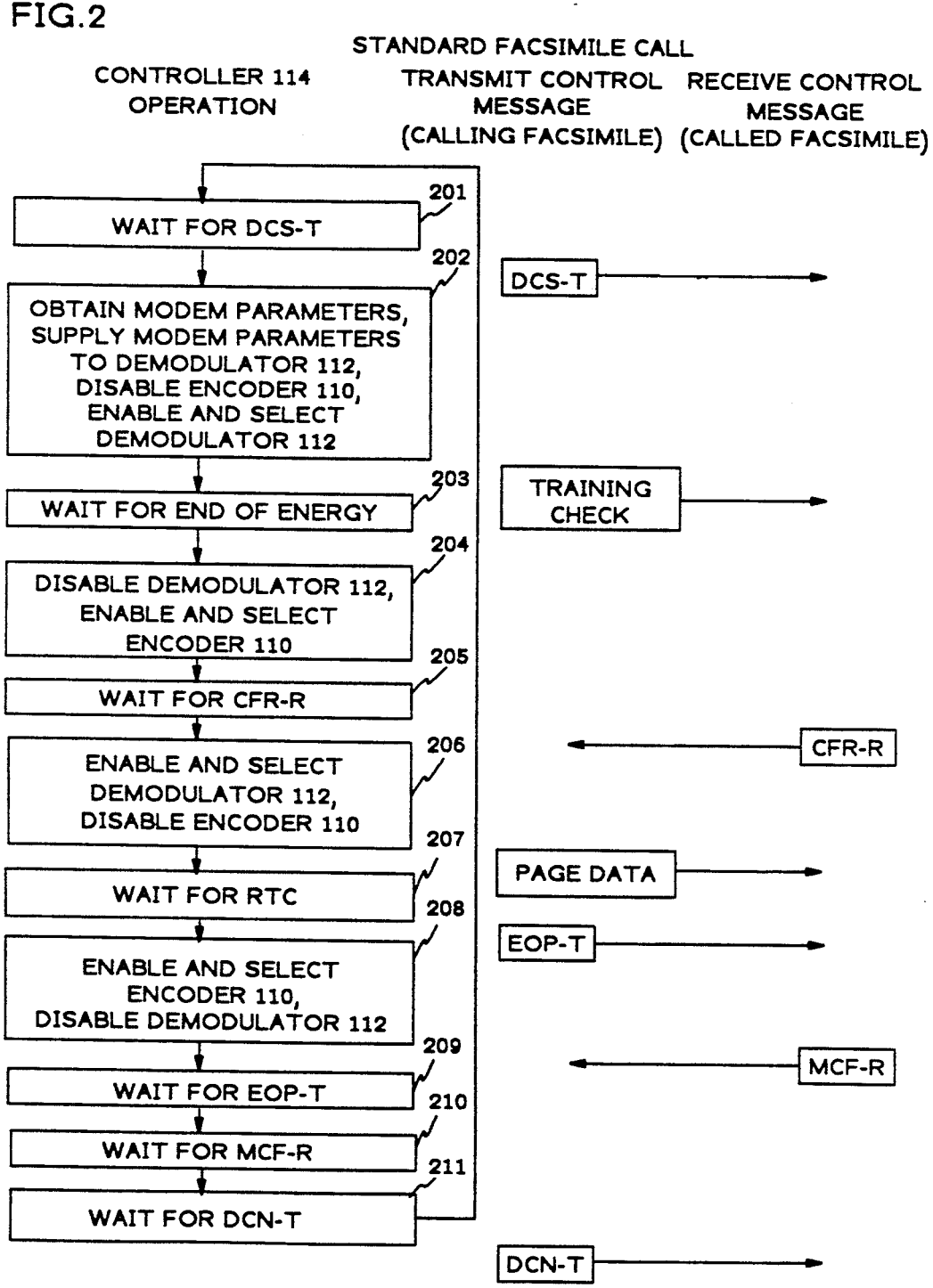
FIG. 2 graphically illustrates operation of controller 114 used in transmitter 101 of FIG. 1 for a standard facsimile call.

For simplicity and clarity of description, two simple examples of the operation of controller 114 will be described. To this end, FIG. 2 illustrates control signal interaction between transmitter 101 and receiver 103 and transmitter 105 and receiver 104 for a typical CCITT Recommendation G3 standard facsimile call. Additionally, shown in FIG. 2 is a sequence of operations effected in controller 114 for controlling voiceband encoder 110, facsimile page demodulator 112 and selector 113, and for generating control information to be supplied via voiceband encoder 110 and facsimile page demodulator 112 along with the channel information to packet assembler 106. In this example, it is assumed that a facsimile call has been established either by the standard exchange of facsimile tone signals between the near-end and far-end facsimile apparatus (not shown), or otherwise, as will be apparent to those skilled in the art. The control messages used in this example are standard CCITT facsimile control messages as described in CCITT Recommendation T.30, Revised, cited above.

As shown in FIG. 2, controller 114 is initially in idle state 201 waiting for transmit control message DCS-T (Digital Command Signal) from control channel demodulator 111 in transmitter 101 (FIG. 1). Upon receiving DCS-T, controller 114 enters state 202 and extracts modem parameters indicating the modem type and modem speed, i.e., the modem transmission rate, for this facsimile call from known fields in the transmit control message DCS-T. These modem parameters are supplied to facsimile page demodulator 112. Additionally, controller 114 supplies a disable encoder signal to voiceband encoder 110, a select page demodulator signal to selector 113, an enable page demodulator signal to facsimile page demodulator 112 and the modem parameters, i.e., modem type and speed, to facsimile page demodulator 112. Then, controller 114 enters state 203 and waits for an end of energy (END) signal which indicates the end of the training check portion of the facsimile call. This end of energy (END) signal is generated by facsimile page demodulator 112 and supplied to controller 114. Upon reception of the end of energy signal controller 114 enters state 204 and supplies a disable page demodulator signal to facsimile page demodulator 112, an enable encoder signal to voiceband encoder 110 and a select voiceband encoder signal to selector 113. Then, controller 114 enters state 205 and waits for reception of receive control message CFR-R (Confirmation To Receive) from control channel demodulator 115. In response to receive control message CFR-R, controller 114 enters state 206 and supplies a disable encoder signal to voiceband encoder 110, and enable page demodulator signal to facsimile page demodulator 112 and a select page demodulator signal to selector 113. Then, controller 114 waits while the facsimile page information is demodulated to obtain the desired baseband digital bit stream which is supplied via selector 113 to transmission network 102 and, therein, to packet assembler 106 for transmission to remote packet disassembler 107 and, in turn, to receiver 103. To this end, controller 114 enters state 207 and waits for a Return To Control (RTC) signal from facsimile page demodulator 112 indicating the end of the facsimile page data. Then, controller 114 enters state 208 and supplies the appropriate control signals to voiceband encoder 110, facsimile page demodulator 112 and selector 113 to select the voiceband path to be supplied to transmission network 102, as described above. Then, controller 114 enters state 209 and waits for transmit control message EOP-T (End of Procedure) and, subsequently, in state 210 waits for receive control message MCF-R (Message Confirmation) from control channel demodulator 115. Finally, controller 114 in state 211 waits for a transmit control message DCN-T (Disconnect) which indicates the end of facsimile call. Thereafter, controller 114 returns to state 201 and waits for a next transmit control message DCS-T which indicates a new facsimile call has been initiated.

Figure 3:
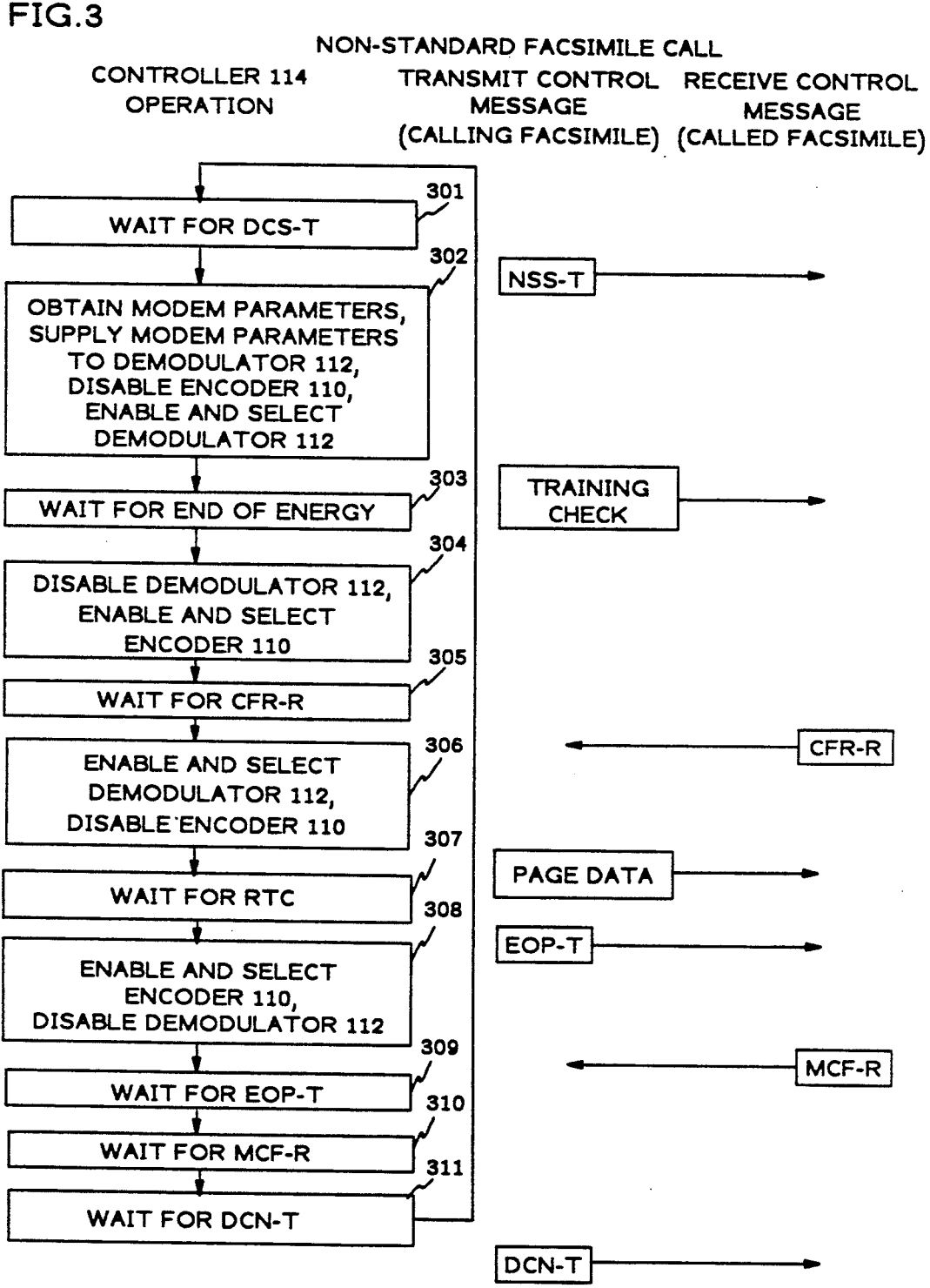
FIG. 3 graphically illustrates operation of controller 114 used in transmitter 101 of FIG. 1 for a so-called non-standard facsimile call.

A second simple example of the operation of controller 114 for a simple non-standard facsimile call is illustrated in FIG. 3. Accordingly, controller 114 in state 301 initially waits for NSS-T (non-standard set up transmit signal) transmit control message from control channel demodulator 111 in transmitter 101 (FIG. 1). In response to transmit control message NSS-T, controller 114 enters state 302 and extracts the facsimile vendor code and country code from known fields in transmit control message NSS-T. Using these fields as an index, controller 114 looks up the bit positions of the modem type and speed parameters from a so-called non-standard facsimile table. The table indicates where the bits are located in the NSS-T frame which identify the modem type to be used and its speed. Then, controller 114 extracts and interprets the actual modem type and speed bits from the transmitted NSS-T message and supplies these modem parameters to facsimile page demodulator 112. Additionally, controller 114 supplies a disable encoder signal to voiceband encoder 110, an enable page demodulator signal to facsimile page demodulator 112 and the modem parameters, i.e., modem type and speed, to facsimile page demodulator 112. Then, controller 114 enters state 303 and waits for an end of energy (END) signal which indicates the end of the training check portion of the facsimile call. In this example, first end of energy signal is representative of the end of the training check. This end of energy signal (END) is generated by facsimile page demodulator 112 and supplied to controller 114. Upon reception of the end of energy (END) signal controller 114 enters state 304 and supplies a disable page demodulator signal to facsimile page demodulator 112, an enable encoder signal to voiceband encoder 110 and a select voice band encoder signal to selector 113. Then, controller 114 enters state 305 and waits for reception of receive control message CFR-R (Confirmation To Receive) from control channel demodulator 115. In response to receive control message CFR-R, controller 114 enters state 306 and supplies a disable encoder signal to voiceband encoder 110, an enable page demodulator signal to facsimile page demodulator 112 and a select page demodulator signal to selector 113. Then, controller 114 waits while the facsimile page information is demodulated to obtain the desired baseband digital bit stream which is supplied via selector 113 to transmission network 102 and, therein, to packet assembler 106 for transmission to remote packet disassembler 107 and, in turn, to receiver 103. Thereafter, controller 114 enters state 307 and waits for a Return To Control (RTC) signal from facsimile page demodulator 112 indicating the end of the facsimile page data. Then, controller 114 enters state 308 and supplies the appropriate control signals to voiceband encoder 110, facsimile page demodulator 112 and selector 113 to select the voiceband path to be supplied to transmission network 102, as described above. Then, controller 114 enters state 309 and waits for transmit control message EOP-T (End of Procedure) and, subsequently, in state 310 waits for receive control message MCF-R (Message Confirmation) from control channel demodulator 115. Finally, controller 114 in state 311 waits for a transmit control message DCN-T (Disconnect) which indicates the end of facsimile call. Thereafter, controller 114 returns to state 301 and waits for a next transmit control message NSS-T which indicates a new facsimile call has been initiated.

Although operation of controller 114 has been described for a relatively simple facsimile call, it will be apparent to those skilled in the art how to expand the operation of controller 114 to any facsimile call, and specifically, those set forth in CCITT recommendation T.30, Revised, noted above.

Control Channel Demodulator

Figure 4:
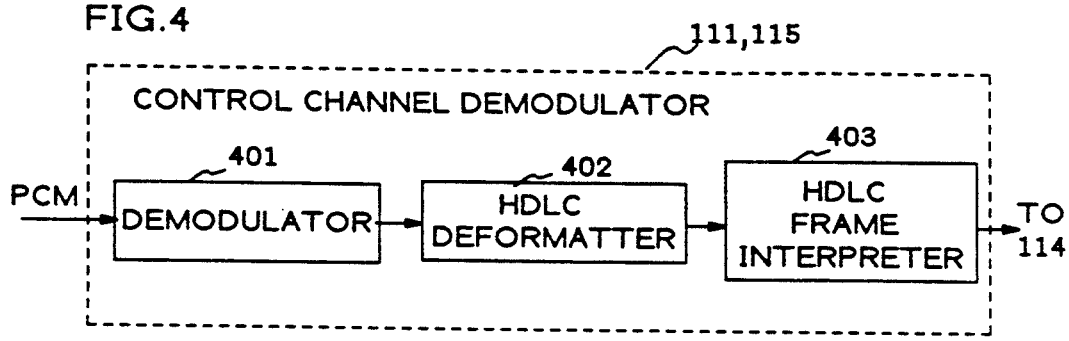
FIG. 4 depicts, in simplified block diagram form, details of control channel demodulators 111 and 115 used in transmitter 101 and receiver 104, respectively, of FIG. 1.

FIG. 4 shows, in simplified block diagram form, details of control channel demodulators 111 and 115, employed in transmitter 101 of FIG. 1 and receiver 104, respectively. Accordingly, the transmit PCM digital signal is supplied to demodulator 401, which in this example, is a CCITT Recommendation V.27demodulator of a type known in the art. It would be apparent to those skilled in the art that other formats, for example, CCITT Recommendation V.27ter, may equally be employed for control messages in a facsimile call. Demodulator 401, in this example, demodulates the control channel portion of the facsimile call. When used in control channel demodulator 111, demodulator 401 yields frames containing transmit control messages, as, for example, shown in FIGS. 2 and 3. When used in control channel demodulator 115, demodulator 401 yields frames containing receive control messages, also shown in FIGS. 2 and 3. The demodulated bits from demodulator 401 are supplied to High Level Data Link Control (HDLC) deformatter 402, where HDLC frame formatting is removed to yield the facsimile control messages in well known fashion. HDLC deformatter 402 also checks each frame for errors by calculating a cyclic redundancy check (CRC). In the event of an error, the corresponding HDLC frame is discarded. Such HDLC deformatters are known in the art (one example, being the commercially available integrated circuit, Motorola MC68652). The HDLC frames are supplied to HDLC frame interpreter 403 to obtain the desired CCITT Recommendation T.30 control messages. HDLC frame interpreter 403, is for example, a look up table including the known facsimile control messages as defined in the CCITT Recommendation T.30 noted above. The control messages are indexed in the table by bits in portions of the HDLC deformatted frames supplied from HDLC deformatter 402. Thereafter, the control messages and other parameters from the facsimile control protocol are supplied to controller 114.

Facsimile Page Demodulator

FIG. 5 shows, in simplified, block diagram form, details of facsimile page demodulator 112 employed in transmitter 101 of FIG. 1. Accordingly, shown are page data demodulator 501, energy detector 502 and training sequence detector 503. The transmit PCM digital signals are supplied to page data demodulator 501, energy detector 502 and training sequence detector 503. Also supplied to each of units 501, 502 and 503 are enable and disable page demodulator signals, i.e., FAX=1 and FAX=0, respectively, and modem type and modem speed parameters from controller 114. The FAX signal and modem type and modem speed parameters are also supplied as control signals from facsimile page demodulator 112 to selector 113 and, in turn, to packet assembler 106 for inclusion in the facsimile packet header. Page data demodulator 501, in this example, demodulates the facsimile page portion of the facsimile call to obtain a baseband digital bit stream. In this example, the facsimile page portion is demodulated by a modem in a manner as described in CCITT Recommendation V.29. It will be apparent to those skilled in the art how to employ the invention when other modem types are used to modulate the baseband digital bit stream, for example, the CCITT Recommendation V.27ter or the CCITT Recommendation V.33. Such page data demodulators are believed known in the art (see for example, the CCITT Recommendations for G3 facsimile calls). Page data demodulator 501 is responsive to the supplied modem parameters to appropriately demodulate facsimile page information and to supply the resulting baseband digital signal via controllable switch 504 to selector 113 (FIG. 1). Energy detector 502 is responsive to the enable page demodulator signal from controller 114 to be enabled for detecting the presence of facsimile page information in the channel of the supplied PCM signals. Detector 502 also generates a M-bit signal which when asserted indicates that energy continues to be present in the information spurt in the facsimile page. The M-bit is asserted during intervals that the returned control (RTC) signal is absent. When the return to control signal is present, indicating the absence of energy in a facsimile page portion of the call, the M-bit is not asserted. The M-bit is supplied via selector 113 to packet assembler 106 for inclusion in a packet header. Additionally, energy detector 502 supplies end of energy (END) signals to controller 114 indicating the end of the training check and the end of the facsimile page information. Training sequence detector 503 is responsive to the modem parameters from controller 114 to detect the type of training sequence in the facsimile call channel of the supplied PCM signals. These training sequences are generally sent by the sending facsimile apparatus at the beginning of the training sequence and each facsimile page spurt. Upon detection of a training sequence, training sequence detector 503 generates a signal to disable controllable switch 504 disabling the output of demodulated facsimile page bits from page data demodulator 501. Additionally, training sequence detector 503 supplies a training sequence in progress (TSIP) signal and a representation of the training sequence type (TS TYPE) via selector 113 to packet assembler 106. Examples of typical training sequences are also described in the CCITT G3 facsimile modem specifications. At the conclusion of the training sequence, training sequence detector 503 generates a signal to enable controllable switch 504, thereby allowing facsimile page data from page data demodulator 501 to be supplied to selector 113, and terminates generation of TSIP. The purpose of training sequence detector 503 is to efficiently convey to the far-end the existence of a training sequence and its type. In this example, a relatively short message is employed, in accordance with an aspect of the invention, to convey to the far-end the same training sequence information. The compression in the training sequence information results from turning to account the realization that there is a relatively small number of types of training sequences.

Packet Format

Figure 6:
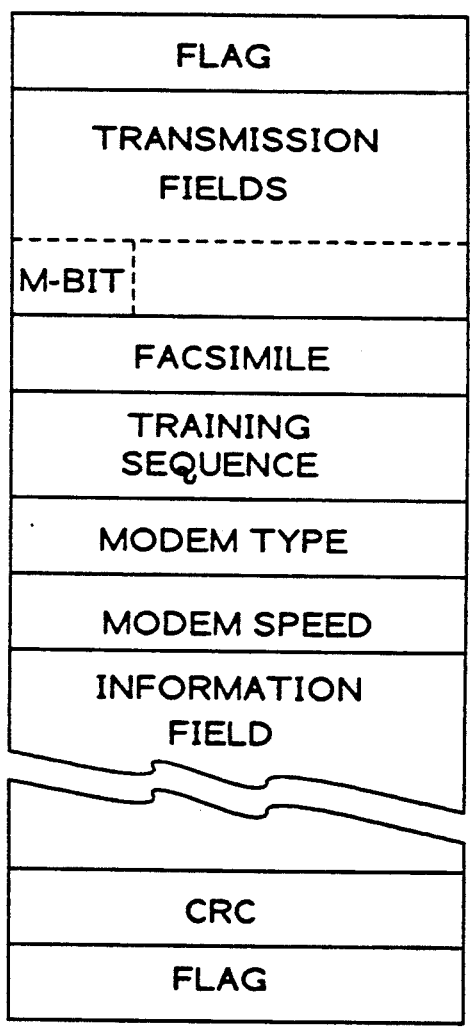
FIG. 6 graphically illustrates a facsimile packet format used in transmission network 102 of FIG. 1.
Figure 7:
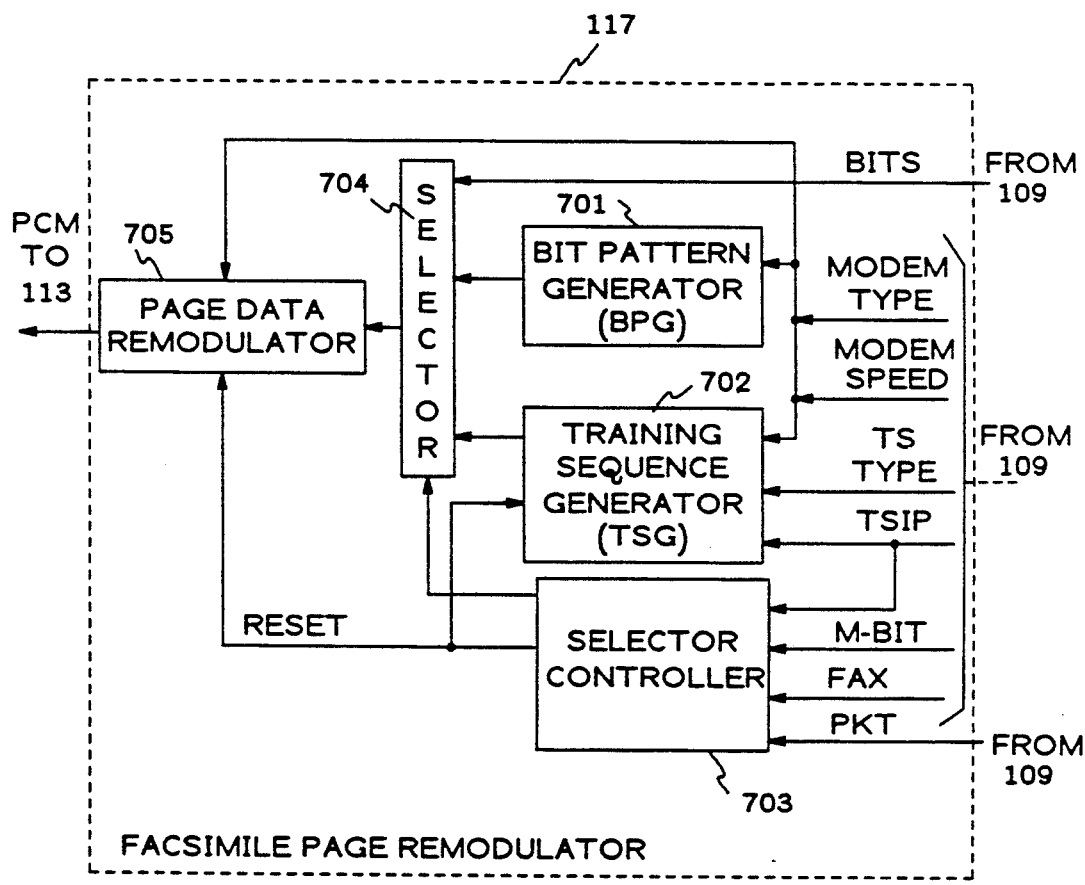
FIG. 7 depicts, in simplified block diagram form, details of facsimile page remodulator 117 of FIG. 1.

FIG. 6 shows in simplified form a facsimile packet format which is generated in packet assembler 106 (FIG. 1). It will be apparent to those skilled in the art how to assemble the packet header information in an efficient manner. Accordingly, shown at the beginning of the packet and end of the packet are the typical flags for delimiting the packet. Also shown, are a number of transmission fields that are employed for the usual packet transmission information which is known and not described here. Thereafter, there is shown a portion of a field for transporting the M-bit supplied from facsimile page demodulator 112. A facsimile field is shown for indicating whether or not the output is from facsimile page demodulator 112, for the current packet (FAX=1 indicates that the output is from facsimile page demodulator 112 and FAX=0 indicates that the output is from voiceband encoder 110). The FAX signal, modem type field and the modem speed field are supplied from controller 114 via facsimile page demodulator 112 and selector 113. Information for the training sequence field, which includes TSIP and TS TYPE is supplied from facsimile page demodulator 112. A typical information field is shown along with a CRC field for the cyclic redundancy check bits. The information field includes the facsimile page bits that are generated by page data demodulator 501. During a training sequence, only the header portion of the packet is transmitted, i.e., the information field is not transmitted. It will be apparent to those skilled in the art how to assemble such a packet. The packets are transmitted over known transmission media to a remote location where they are disassembled in well known fashion in packet disassembler 107 to obtain the desired information. In turn, the recovered information is supplied to receiver 103.

Although not specifically shown, packet assembler 106 also generates packets in a voiceband format for transporting the voiceband output from voiceband encoder 110. The voiceband packet format is similar to the facsimile packet format shown in FIG. 6 but does not include the training sequence, modem type and modem speed fields, and the FAX control signal is set to FAX=0. For the voiceband packets the FAX signal is supplied from controller 114 via voiceband encoder 110 and selector 113.

Facsimile Page Remodulator

FIG. 7 shows, in simplified block diagram form, details of facsimile page remodulator 117 employed in receiver 104 of FIG. 1. Accordingly, shown are bit pattern generator (BPG) 701, training sequence generator (TSG) 702, selector controller 703, selector 704 and page data remodulator 705. Information from a received packet is obtained from packet disassembler 109, including information bits (BITS), training sequence type (TS TYPE), training sequence in progress (TSIP), packet present (PKT), M-bit, the modem parameter information, i.e., modem type and speed, and the facsimile call indicator FAX. The FAX signal enables and disables facsimile page remodulator 117, as is explained below. The information BITS are supplied to selector 704. TS TYPE and TSIP are supplied to training sequence generator 702. TSIP, M-bit, FAX and PKT are supplied to selector controller 703. It is noted that PKT is generated by packet disassembler 109 and indicates whether or not a packet is present. The modem parameters, i.e., modem type and speed, are supplied to units 701, 702, 703 and 705. Bit pattern generator 701 is responsive to the modem type and speed parameters for continually supplying as an output an optimized set of bits to selector 704 for the purpose of compensating for an inadvertent loss of packet. This set of bits is needed to maintain proper operation of page data remodulator 705 in the event that there are no bits (BITS) from a received packet. Training sequence generator 702 is responsive to the modem type and speed parameters, TS TYPE, and TSIP to regenerate data bit patterns indicative of the appropriate training sequence to be supplied to selector 704. Training sequence generator 702 is responsive to a RESET signal from selector controller 703 to initialize generation of the appropriate training sequence. Page data remodulator 705 is responsive to the modem parameters, i.e., type and speed, and to the RESET signal from selector controller 703, to remodulate the baseband facsimile page portion of the facsimile call (BITS) from selector 704 to obtain a reconstructed modem modulated facsimile signal. Page data remodulator 705 is, in this example, a CCITT Recommendation V.29 type remodulator. Again, it will be apparent to those skilled in the art that other CCITT facsimile formats maybe employed, for example V.27ter or V.33.

Selector controller 703 operates to select either BITS, an output from bit pattern generator (BPG) 701, or an output from training sequence generator (TSG) 702 to be supplied via selector 704 to page data remodulator 705. Additionally, a RESET signal is supplied from selector controller 703 to training sequence generator 702 and page data remodulator 705. To this end, FIG. 8 shows a state diagram illustrating states in the operation of selector controller 703. Accordingly, selector controller is initially in idle state 801 waiting for a training sequence facsimile packet as indicated by TSIP, PKT and FAX being asserted (TSIP*PKT*FAX). Upon receipt of the asserted TSIP, PKT and FAX signals, selector controller 703 transitions to training sequence state 802. During state 802, selector 704 is configured to select the training sequence output from TSG 702. If while in state 802, FAX is negated, i.e., ($\overline{FAX}$), selector controller 703 transitions back to idle state 801 and a RESET is generated. While in state 802, selector controller 703 waits for a normal (as opposed to a training sequence) facsimile page information packet (indicated by $\overline{TSIP}$*PKT*FAX). If this event does not occur by the end of a training sequence, controller 703 transitions back to state 801 and resets remodulator 705. Upon the occurrence of this event (i.e., $\overline{TSIP}$*PKT*FAX), selector controller 703 transitions to facsimile page state 803. During state 803, selector 704 is configured to select BITS as an output. Selector controller 703 remains in facsimile page state 803 until packets stop arriving (indicated by occurrence of $\overline{PKT}$) or FAX is negated (indicated by $\overline{FAX}$). If $\overline{PKT}$ occurs and the M-bit is not set as indicated by ($\overline{PKT}$*M-BIT), or if PKT is asserted and FAX is negated (indicated by PKT*$\overline{FAX}$), selector controller 703 transitions back to idle state 801. Additionally, if while in state 803, $\overline{PKT}$ occurs and the M-bit of the previous packet was set, a packet has been lost as indicated by ($\overline{PKT}$*M-BIT), and selector controller 703 transitions to bridge state 804. During bridge state 804, selector 704 is configured to supply the output from BPG 701 to page data remodulator 705. Additionally, a timer (not shown) is initiated. If during the timer interval, a packet (PKT) arrives and FAX is asserted as indicated by (PKT*FAX), the timer is disabled, and selector controller 703 transitions back to facsimile page state 803. In state 803, selector 704 is again configured to supply BITS to page data remodulator 705. Alternatively, if the timer interval expires while selector controller 703 is in bridge state 804, the lost packet was the last packet of the facsimile page and selector controller 703 transitions to idle state 801 waiting for the next facsimile page information. Additionally, if while in state 804 FAX is negated and PKT is asserted as indicated by (PKT*$\overline{FAX}$), selector controller 703 transitions back to idle state 801. While in idle state 801, selector controller 703 generates a RESET signal, which resets both page data remodulator 705 and training sequence generator 702.

We claim:

1. Apparatus for transmitting voiceband signals from at least voice and/or facsimile calls to a transmission network, the facsimile calls having portions including facsimile call control messages and portions including modulated facsimile call page data, the apparatus comprising:
   means for demodulating the control message portion of the facsimile call to obtain demodulated facsimile call control messages;
   control means supplied with said demodulated facsimile call control messages for generating facsimile call page data demodulation control signals and a facsimile call indication (FAX) signal, said FAX signal being representative of whether a current portion of the call is the facsimile call control message portion or the facsimile call page data portion;
   means for encoding voiceband signals;
   controllable means responsive to said facsimile call page data demodulation control signals and said FAX signal for compressing facsimile call page data into a baseband digital bit stream and for generating additional control signals, said facsimile call page data demodulation control signals, said FAX signal and said additional control signals being supplied as facsimile call remodulation control signals as an output from said controllable means with said baseband digital bit stream; and
   means responsive to said FAX signal for supplying an output to the transmission network from said means for encoding voiceband signals during facsimile call control message portions of the facsimile call and for supplying an output to the transmission network from said controllable means during facsimile call page data portions of the facsimile call, wherein encoded facsimile call control message portions of the facsimile call and said FAX signal, and said baseband digital bit stream representative of facsimile call page data portions of the facsimile call and said facsimile call remodulation control signals are appropriately supplied to the transmission network.

2. The apparatus as defined in claim 1 wherein said means for encoding includes means for compressing said voiceband signals.

3. The apparatus as defined in claim 2 wherein said means for compressing voiceband signals comprises adaptive differential pulse code modulation encoder means.

4. The apparatus as defined in claim 1 wherein said facsimile call control messages are modem modulated and said means for demodulating the facsimile call control message portion includes means for demodulating a modem modulated facsimile call control message portion of the facsimile call.

5. The apparatus as defined in claim 1 wherein said means for supplying an output includes means in said means for encoding voiceband signals which is responsive to prescribed states of said FAX signal for controllably enabling and disabling supplying an output from said means for encoding voiceband signals and means in said controllable means which is responsive to said prescribed states of said FAX signal for controllably disabling and enabling supplying an output from said controllable means, wherein said means for encoding said voiceband signals is enabled when said controllable means is disabled and vice versa.

6. The apparatus as defined in claim 5 wherein said facsimile call page data comprises modem modulated baseband facsimile page data, and wherein said controllable means includes means responsive to said facsimile call page data demodulation control signals for demodulating said modem modulated baseband facsimile page data to obtain said baseband digital bit stream.

7. The apparatus as defined in claim 6 wherein said transmission network includes packet assembler means for assembling said output from said means for encoding voiceband signals and said FAX signal into packets and for assembling said output from said controllable means and said facsimile call remodulation control signals supplied therewith into packets and means for supplying said packets to a transmission medium.

8. The apparatus as defined in claim 6 wherein said control means is responsive to said demodulated facsimile call control messages for generating facsimile page data demodulation control signals representative of a modem type and a modem transmission rate of a modem employed to generate said facsimile call page data, said modem type and modem transmission rate control signals being supplied to said means for demodulating said facsimile page data and wherein said means for demodulating said facsimile page data is responsive to said modem type and modem transmission rate control signals to demodulate said facsimile call page data to obtain said baseband digital bit stream.

9. The apparatus as defined in claim 8 wherein said means for demodulating generates a signal representative of the end of said facsimile call page data, wherein said controllable means further includes means responsive to said facsimile page data demodulation control signals for detecting the presence or absence of energy in a facsimile page data portion of the facsimile call, said signal representative of the end of said facsimile call page data and said signal representing the presence or absence of energy in the facsimile page data portion of the facsimile call being supplied to said control means and wherein said control means is responsive to said signal representative of the end of said facsimile call page data and to said signal representative of the presence or absence of energy in the facsimile page data portion of the facsimile call for generating said FAX signal.

10. The apparatus as defined in claim 9 wherein said controllable means further includes means for detecting the presence of a training sequence in said facsimile call and for generating a training sequence in progress control signal representative that a training sequence is in progress and a type of training sequence control signal representative of the type of training sequence.

11. The apparatus as defined in claim 10 wherein said means for supplying supplies said FAX signal to said transmission network representative that said means for encoding is enabled and that said controllable means is disabled along with an output from said means for encoding during said control message portion of the facsimile call and supplies said facsimile call remodulation control signals to said transmission network including said FAX signal representative that said means for encoding is disabled and that said controllable means is enabled, said modem type, said modem transmission rate, said training sequence in progress, said training sequence type and said signal representative of the presence or absence of energy during the facsimile call page data portion of the facsimile call when said controllable means in enabled.

12. The apparatus as defined in claim 11 wherein said controllable means further includes means for inhibiting an output from said means for demodulating said facsimile page data during intervals that said training sequence detection means generates a training sequence in progress control signal and a training sequence type control signal.

13. The apparatus as defined in claim 12 wherein said transmission network includes means for generating a packet including at least a header having a plurality of fields, wherein said training sequence in progress control signal and the training sequence type control signal, along with prescribed other of the facsimile call remodulation control signals are inserted into prescribed fields of the packet header and the packet is transmitted without an information field.

14. The apparatus as defined in claim 11 wherein said transmission network includes means for generating a packet including at least a header having a plurality of fields and an information field and wherein bits of said baseband digital bit stream are inserted into said information field, and said facsimile call remodulation control signals supplied along with said baseband digital bit stream are inserted in prescribed fields in said header.

15. Apparatus for receiving a digital bit stream including voiceband signal representations of at least voice and/or facsimile calls from a transmission network, the apparatus comprising:

means for decoding encoded voiceband signals in the received digital bit stream from the transmission network;

controllable means responsive to received facsimile call remodulation control signals from the received digital bit stream for recomposing facsimile call page data from a received baseband digital bit stream in the received digital bit stream; and means responsive to a received facsimile call indication (FAX) signal from the received digital bit stream for supplying an output from either said means for decoding or said controllable means, wherein the output from said means for decoding includes facsimile call control messages and is selected as the output when said received FAX signal indicates a facsimile call control message portion of the facsimile call and wherein the output from said controllable means includes representations of modulated facsimile call page data and is selected as the output when said received FAX signal indicates a facsimile call page data portion of the facsimile call.

16. The apparatus as defined in claim 15 wherein said transmission network includes means for receiving packets from a transmission medium and packet disassembler means for disassembling said received packets to obtain said digital bit stream, said baseband digital bit stream and said received facsimile call remodulation control signals including a received FAX signal.

17. The apparatus as defined in claim 15 wherein said means for supplying an output includes means in said means for decoding which is responsive to said received FAX signal for controllably enabling and disabling supplying an output from said means for decoding and means in said controllable means which is responsive to said received FAX signal for controllably disabling and enabling supplying an output from said controllable means, the means for decoding being enabled when said controllable means is disabled and vice versa.

18. The apparatus as defined in claim 15 wherein said means for decoding comprises adaptive differential pulse code modulation decoder means.

19. The apparatus as defined in claim 15 wherein said controllable means includes means responsive to said received facsimile call remodulation control signals for remodulating said baseband digital bit stream to obtain modem modulated facsimile page data.

20. The apparatus as defined in claim 19 wherein said controllable means further includes means for generating a prescribed bit pattern in response to prescribed ones of said received facsimile call remodulation control signals, means for generating a training sequence in response to prescribed ones of said received facsimile call remodulation control signals, facsimile page data remodulator means responsive to prescribed ones of said facsimile call remodulation control signals for generating a modem modulated representation of signals supplied thereto, and selector controller means responsive to prescribed ones of said received remodulation control signals for controllably supplying either said baseband digital bit stream, an output from said bit pattern generator means or an output from said training sequence generating means to said facsimile page data remodulator means.

21. The apparatus as defined in claim 20 wherein said facsimile page remodulator means is responsive to prescribed ones of said received facsimile call remodulation control signals for enabling and disabling an output therefrom.

22. Apparatus including transmitter means for transmitting digital signals representative of at least voice and/or facsimile calls and receiver means for receiving digital signals representative of the at least voice and/or facsimile calls, the facsimile calls having portions including facsimile call control messages and portions including modulated facsimile call page data, said transmitter means comprising:
    means for demodulating the control message portion of the facsimile call to obtain demodulated facsimile call control messages;
    control means supplied with said demodulated facsimile call control messages for generating facsimile call page data demodulation control signals and a facsimile call indication (FAX) signal, said FAX signal being representative of whether a current portion of the call is the facsimile call control message portion or the facsimile call page data portion;
    means for encoding voiceband signals;
    first controllable means responsive to said facsimile call page data demodulation control signals and said FAX signal for compressing facsimile call page data into a baseband digital bit stream and for generating additional control signals, said facsimile call page data demodulation control signals, said FAX signal and said additional control signals being supplied as facsimile call remodulation control signals as an output from said first controllable means with said baseband digital bit stream; and
    first means responsive to said FAX signal for supplying an output to the transmission network from said means for encoding voiceband signals during facsimile call control message portions of the facsimile call and for supplying an output to the transmission network from said first controllable means during facsimile call page data portions of the facsimile call, wherein encoded facsimile call control message portions of the facsimile call, and said FAX signal, and said baseband digital bit stream representative of facsimile call page data portions of the facsimile call and said facsimile call remodulation control signals are appropriately supplied to the transmission network; and
    said receiver means comprising:
    means for decoding encoded voiceband signals in the received digital bit stream from the transmission network;
    second controllable means responsive to received facsimile call remodulation control signals from the received digital bit stream for recomposing facsimile call page data from a received baseband digital bit stream in the received digital bit stream; and
    second means responsive to a received FAX signal from the received digital bit stream for supplying an output from either said means for decoding or said second controllable means, wherein the output from said means for decoding includes facsimile call control messages and is selected as the output when said received FAX signal indicates a facsimile call control message portion of the facsimile call and wherein the output from said second controllable means includes representations of modulated facsimile call page data and is selected as the output when said received FAX signal indicates a facsimile call page data portion of the facsimile call.

23. The apparatus as defined in claim 22 wherein said means for encoding comprises adaptive differential pulse code modulation encoder means, and wherein said means for decoding comprises adaptive differential pulse code modulation decoder means.

24. The apparatus as defined in claim 22 wherein said means for demodulating said facsimile call control message portion includes means for demodulating a modem modulated control message portion of the facsimile call.

25. The apparatus as defined in claim 22 wherein said first means for supplying an output includes means in said means for encoding which is responsive to said FAX signal for controllably enabling and disabling supplying an output from said means for encoding and means in said first controllable means which is responsive to said FAX signal for controllably disabling and enabling supplying an output from said first controllable means, said means for encoding being enabled when said first controllable means is disabled and vice versa, and wherein said second means for supplying an output includes means in said means for decoding which is responsive to said received FAX signal for controllably enabling and disabling supplying an output from said means for decoding and means in said second controllable means which is responsive to said received FAX signal for controllably disabling and enabling supplying an output from said second controllable means, said means for decoding being enabled when said second controllable means is disabled and vice versa.

26. The apparatus as defined in claim 22 wherein said transmission network includes packet assembler means for assembling said output from said means for encoding voiceband signals and said FAX signal into packets and for assembling said output from said first controllable means and said facsimile call remodulation control signals supplied therewith into packets, means for supplying said packets to a transmission medium, means for receiving packets from a transmission medium and packet disassembler means for disassembling said received packets to obtain said received encoded voiceband signals and received FAX signal, said received baseband digital bit stream and said received facsimile call remodulation control signals.

27. The apparatus as defined in claim 22 wherein said facsimile call page data comprises modem modulated baseband facsimile page data, and wherein said first controllable means includes means responsive to said facsimile page data demodulation control signals for demodulating said modem modulated baseband facsimile page data to obtain said baseband digital bit stream, and wherein said second controllable means includes means responsive to said received facsimile call remodulation control signals for remodulating said received baseband digital bit stream to obtain modem modulated facsimile page data.

28. A system including local means for transmitting voiceband digital signals representative of at least voice and/or facsimile calls over a transmission network to remote means for receiving, and remote means for transmitting voiceband digital signals representative of at least voice and/or facsimile calls over the transmission network to local means for receiving, each of the facsimile calls having portions including facsimile call control messages and having portions including modulated facsimile call page data, each of said means for transmitting comprising:
means for demodulating the facsimile call control message portion to obtain demodulated facsimile call control messages;
control means supplied with said demodulated facsimile call control messages for generating facsimile call page data demodulation control signals and a facsimile call indication (FAX) signal, said FAX signal being representative of whether a current portion of the call is the facsimile call control message portion or the facsimile call page data portion;
means for encoding voiceband signals;
first controllable means responsive to said facsimile call page data demodulation control signals and said FAX signal for compressing facsimile call page data into a baseband digital bit stream and for generating additional control signals, said facsimile call page data demodulation control signals, said FAX signal and said additional control signals being supplied as facsimile call remodulation control signals as an output from said first controllable means with said baseband digital bit stream; and
first means responsive to said FAX signal for supplying an output to the transmission network from said means for encoding voiceband signals during facsimile call control message portions of the facsimile call and for supplying an output to the transmission network from said first controllable means during facsimile call page data portions of the facsimile call, wherein encoded facsimile call control message portions of the facsimile call and said FAX signal, and said baseband digital bit stream representative of facsimile call page data portions of the facsimile call and said facsimile call remodulation control signals are appropriately supplied to the transmission network; and said receiver means comprising:
means for decoding encoded voiceband signals in the received digital bit stream from the transmission network;
second controllable means responsive to received facsimile call remodulation control signals from the received digital bit stream for recomposing facsimile call page data from a received baseband digital bit stream in the received digital bit stream; and
supplying means responsive to a received FAX signal from the received digital bit stream for supplying an output from either said means for decoding or said second controllable means, wherein the output from said means for decoding includes facsimile call control messages and is selected as the output when said received FAX signal indicates a facsimile call control message portion of the facsimile call and wherein the output from said second controllable means includes representations of modulated facsimile call page data and is selected as the output when said received FAX signal indicates a facsimile call page data portion of the facsimile call.

29. The apparatus as defined in claim 28 wherein said means for encoding comprises adaptive differential pulse code modulation encoder means, and wherein said means for decoding comprises adaptive differential pulse code modulation decoder means.

30. The apparatus as defined in claim 28 wherein said means for demodulating the facsimile call control message portion includes means for demodulating a modem modulated facsimile call control message portion of the facsimile call.

31. The apparatus as defined in claim 28 wherein said first means for supplying an output includes means in said means for encoding which is responsive to said FAX signal for controllably enabling and disabling supplying an output from said means for encoding and means in said first controllable means which is responsive to said FAX signal for controllably disabling and enabling supplying an output from said first controllable means, wherein said means for encoding is enabled when said first controllable means is disabled and vice versa, and wherein said second means for supplying an output includes means in said means for decoding which is responsive to said received FAX signal for controllably enabling and disabling supplying an output from said means for decoding and means in said second controllable means which is responsive to said received FAX signal for controllably disabling and enabling supplying an output from said second controllable means, wherein said means for decoding is enabled when said second controllable means is disabled and vice versa.

32. The apparatus as defined in claim 31 wherein said transmission network includes packet assembler means for assembling said output from said means for encoding voiceband signals and said FAX signal into packets and for assembling said output from said first controllable means and said facsimile call remodulation control signals supplied therewith into packets, means for supplying said packets to a transmission medium, means for receiving packets from a transmission medium and packet disassembler means for disassembling said received packets to obtain said received encoded voiceband signals and a received FAX signal, said received baseband digital bit stream and said received facsimile call remodulation control signals.

33. The apparatus as defined in claim 32 wherein said facsimile call page data comprises modem modulated baseband facsimile page data, and wherein said first controllable means includes means responsive to said facsimile page data demodulation control signals for demodulating said modem modulated baseband facsimile page data to obtain said baseband digital bit stream, and wherein said second controllable means includes means responsive to said received facsimile call remodulation control signals for remodulating said received baseband digital bit stream to obtain modem modulated facsimile page data.

* * * * *